US005145627A

United States Patent [19]

Berion et al.

[11] Patent Number: 5,145,627

[45] Date of Patent: Sep. 8, 1992

[54] PROCESS FOR PRODUCING COLORED DECORATIVE PANELS BASED ON EXFOLIATED ROCK PARTICLES

[75] Inventors: Roland Berion, Nods; Mile D. Garnier, Poissy; Claude Menard, Pont Sainte-Marie, all of France

[73] Assignee: Efisol, Paris, France

[21] Appl. No.: 617,035

[22] Filed: Nov. 16, 1990

[30] Foreign Application Priority Data

Nov. 20, 1989 [FR] France ............ 89 15171

[51] Int. Cl.[5] ............ B29C 43/30; B32B 19/04

[52] U.S. Cl. ............ 264/113; 264/118; 264/120

[58] Field of Search ............ 264/110, 113, 118, 120, 264/74

[56] References Cited

U.S. PATENT DOCUMENTS

| | | | |
|---|---|---|---|
| 1,578,812 | 3/1926 | Dawes et al. | 264/110 |
| 1,807,206 | 5/1931 | Frederick | 264/110 |
| 1,872,234 | 8/1932 | Boughton | 264/110 |
| 1,901,352 | 3/1933 | McCarthy | 264/110 |
| 1,987,556 | 1/1935 | Frederick | 264/110 |
| 2,281,591 | 5/1942 | Moore | 264/113 |
| 2,493,694 | 1/1950 | Shepard | 264/110 |
| 3,078,510 | 2/1963 | Rowe | 264/122 |
| 3,466,354 | 9/1969 | Donner | 264/118 |
| 3,632,371 | 1/1972 | Mikulka | 264/113 |
| 3,830,892 | 8/1974 | Wada | 264/25 |

*Primary Examiner*—Mary Lynn Theisen
*Attorney, Agent, or Firm*—Richard C. Litman

[57] ABSTRACT

A process and a plant for manufacturing decorative panels or slabs of granular or particulate mineral material bound by a binder are provided in which at least one bottom or base layer comprising an intimate mixture of said material and said binder is continuously formed and at least one upper decorative layer constituted by the same materials but in which the binder is colored is continuously applied to the base layer followed by precompression, diversion into slabs, pressing and baking.

9 Claims, 4 Drawing Sheets

PROCESS FOR PRODUCING COLORED DECORATIVE PANELS BASED ON EXFOLIATED ROCK PARTICLES

BACKGROUND OF THE INVENTION

The present invention relates to a process and an installation for continuous production of colored panels of particulate or granular material agglomerated by the use of a binder and in particular to panels consisting of particles of exfoliated rock such as vermiculites. The invention also relates to panels obtained by this process and through the use of the said installation.

By varying the particle size of the materials employed and depending upon whether the binder is in its natural form or is colored, a wide range of decorative effects and colors are obtained in panels the chief characteristics of which lie in their insulating properties, their lightness of weight, strength and their fire-resistant properties.

The process in accordance with the invention provides numerous advantages when compared to known processes.

More precisely, using the process for continuous production ensures that the materials are prepared in a standard manner and that there is perfect reproducibility of the characteristics of the panel obtained as regards shape, composition and quality from one panel to the next. The means provided for carrying out checking and control in the installation ensure that the correct amount of particles and of binders are always employed, and continuous operation of the plant makes it possible to reduce the number of prepared materials requiring to be stored, through the use of small amounts which are adapted to requirements of the plant, thus avoiding the need to hold large stocks.

The coloring of the panel is obtained, contrary to known processes, by adding to a base-layer which is impregnated with natural binder, a layer which is bulk colored obtained by the use of a binder which is colored and penetrates during an impregnation step into the body of the treated particulate matter and confers a permanent and durable coloring on the panel thus obtained.

Moreover, the process according to the invention makes it possible to provide multi-layer panels leading to the possibility of employing different particle sizes and materials for each layer as well as of varying the thickness and the number of layers.

SUMMARY OF THE INVENTION

In accordance with the invention, a material resulting from the blending of measured amounts of said particulate matter and an inorganic binder in the liquid or viscous state is continuously deposited onto a movable forming and shaping surface and is then rendered even and slightly compacted in order to form at least one base layer, and at least one further upper layer formed by a mass of particles of the same nature as the first and previously divided into small pieces and which has been thoroughly impregnated with a colored binder is continuously deposited onto said base layer, the combination of said layers moving along said forming and shaping surface and after flattening off of at least the upper layer, undergoing pre-compression and then being cut into panels which, after passing through a press, are subjected to thermal treatment in a kiln.

According to a preferred embodiment of the process the particulate matter employed consists of particles of vermiculite, of a particle size comprised between 0.3 and 4 mm, and the binder is an alkaline silicate having a viscosity of the order of 350 mPa.

According to a further embodiment of the process the thorough impregnation of the particulate matter with a colored binder is achieved by imparting a swirling movement thereto in order to intimately disperse said matter within the colored binder which is provided in spray form.

Preferably, the particle size of the particulate matter employed for preparing said colored layer is different from the particle size of the other layers.

According to one embodiment of the process, the movable forming and shaping surface is constituted by a conveyer-belt means which operates in association with at least two distributors for impregnated particles the first of said distributors feeding non-colored particles and being made up by a hopper with a base having two diverging surfaces originating from a common line located transversally with respect to the direction of advance of said conveyer-belt with the spacings between the walls of said hopper and said diverging surfaces respectively constituting first and second pouring means, the lower edge of one of said surfaces which is located in advance, with respect to said direction of travel, of said common line constituting a limiting means determining the height of a first layer being dispensed from the first pouring means of said hopper while a variable-height sliding gate means located after, in said direction of travel, said first distributor determines the thickness of a second layer being provided by the second pouring means of said hopper, a compression roller being located after each of said first and second pouring means, the second of said distributors feeding colored particles and being located, in the direction of travel, after said first distributor and being provided with means for breaking up said impregnated colored particulate matter into small pieces and for flattening the layer deposited.

According to a preferred way of carrying out the process of the invention said means providing for the breaking up of said particulate matter into small pieces and for flattening the layer deposited comprise means obliging said impregnated particulate matter to follow a tortuous path within said second distributor and vaned rotating means for spinning said impregnated particulate material at its point of discharge from said distributor and applying it in finely divided form in a thickness determined by the vertical height of the vaned rotating means.

According to yet a further preferred way of carrying out the process the levels of said variable-height sliding gate means of the first distributor and of the point of discharge from said second distributor are controlled by an integrated system for regulating the thicknesses of the upper layers of said panel.

According to still a further preferred way of carrying out the process, a mat composed of the previously formed layers applied by said first and second distributors is subsequently shaped by continuous pressing with the aid of a pre-shaping compression plate the height of which is set by a pivot point at one end thereof and to the other end of which an alternating vertical motion is imparted.

In one embodiment of the process according to the invention, one single motor rotatively drives, by means of a continuous drive belt means, a means for imparting an alternating vertical motion to said pre-shaping compression plate and a means for imparting an oscillatory movement to an oscillating table located under said movable forming and shaping surface.

According to yet a further preferred embodiment, recirculating means are provided for the colored binder obtained thus guaranteeing that a desired constant temperature and good homogeneity of said colored binder are maintained.

The invention also provides an installation for carrying out the process, the installation comprising a multilayer distributing and spreading device made up by a conveyer-belt means associated with at least two distributors for said binder-impregnated materials the first of said distributors being for non-colored bulk matter and being made up by a hopper the base of which is formed of two diverging surfaces the common line of which is located transversally with respect to the direction of advance of said conveyer-belt with the spacings between the walls of said hopper and said diverging surfaces constituting first and second pouring means, the lower edge of one of said surfaces which is located in advance, with respect to said direction of travel, of said common line constituting a limiting means determining the height of a first layer being dispensed from the first pouring means of said hopper while a variable-height sliding gate means located after, in said direction of travel, said first distributor determines the thickness of a second layer being provided by the second pouring means of said hopper, a compression roller being located after each of said first and second pouring means, the second of said distributors being adapted to feed impregnated colored particles and being located, in the direction of travel, after said first distributor and being provided with means for breaking up said impregnated colored particulate matter into small pieces and for flattening the layer deposited, the means providing for the breaking up of the impregnated colored particulate matter into small pieces and for flattening the upper layer formed consisting of baffles constituting a tortuous path on the walls of the hopper and of a spinning distribution device provided with rotating vanes arranged at the discharge outlet from said second distributor.

In one preferred embodiment of said installation the levels of said variable height sliding gate of the first distributor and of the point of discharge of said second distributor are controlled by an integrated system for regulating the thicknesses of the upper layers of said panel.

According to a further preferred embodiment, following said multi-layer distributing and spreading device, a shaping machine is provided which performs continuous pressing of the composite mat composed of the previously formed layers passing along a shaping surface sliding over an oscillating table, said shaping machine including a compression plate pivoting at one of its ends and driven by an alternating vertical movement at the other end thereof by means of a connecting link attached to an eccentrically-located pivot point provided on a rotating pulley. Preferably, one single motor drives, by means of continuous belt means, a motion converting assembly providing the oscillations of said movable table, and also drives said pulley carrying the eccentrically-located pivot for actuating the connecting rod of said compression plate.

Regarding the preparation of the material impregnated with colored binder the installation preferably includes a sub-unit for preparing colored binder for use in the preparation of said impregnated colored particulate matter, this comprising a double-walled reaction vessel fitted with agitating means, level sensors and with pump means for transfer of said colored binder to a buffer supply tank and which is further provided with openings for the supply of measured amounts of binder, of water and of coloring material The invention also provides, by way of a novel industrial product panels of particulate or granular material bonded together by a binder which are novel in that they are made up of at least two layers of particles united by compression and thermal treatment in a kiln, at least one of said layers being bulk impregnated by a binder in natural form and at least one other layer being bulk impregnated by a colored binder.

Further details and advantages of the invention will become more clear from the description that follows of one embodiment of the invention provided by way of non-limiting example and with reference to the attached drawings.

DETAILED DESCRIPTION OF A PREFERRED EMBODIMENT

Figure 1:
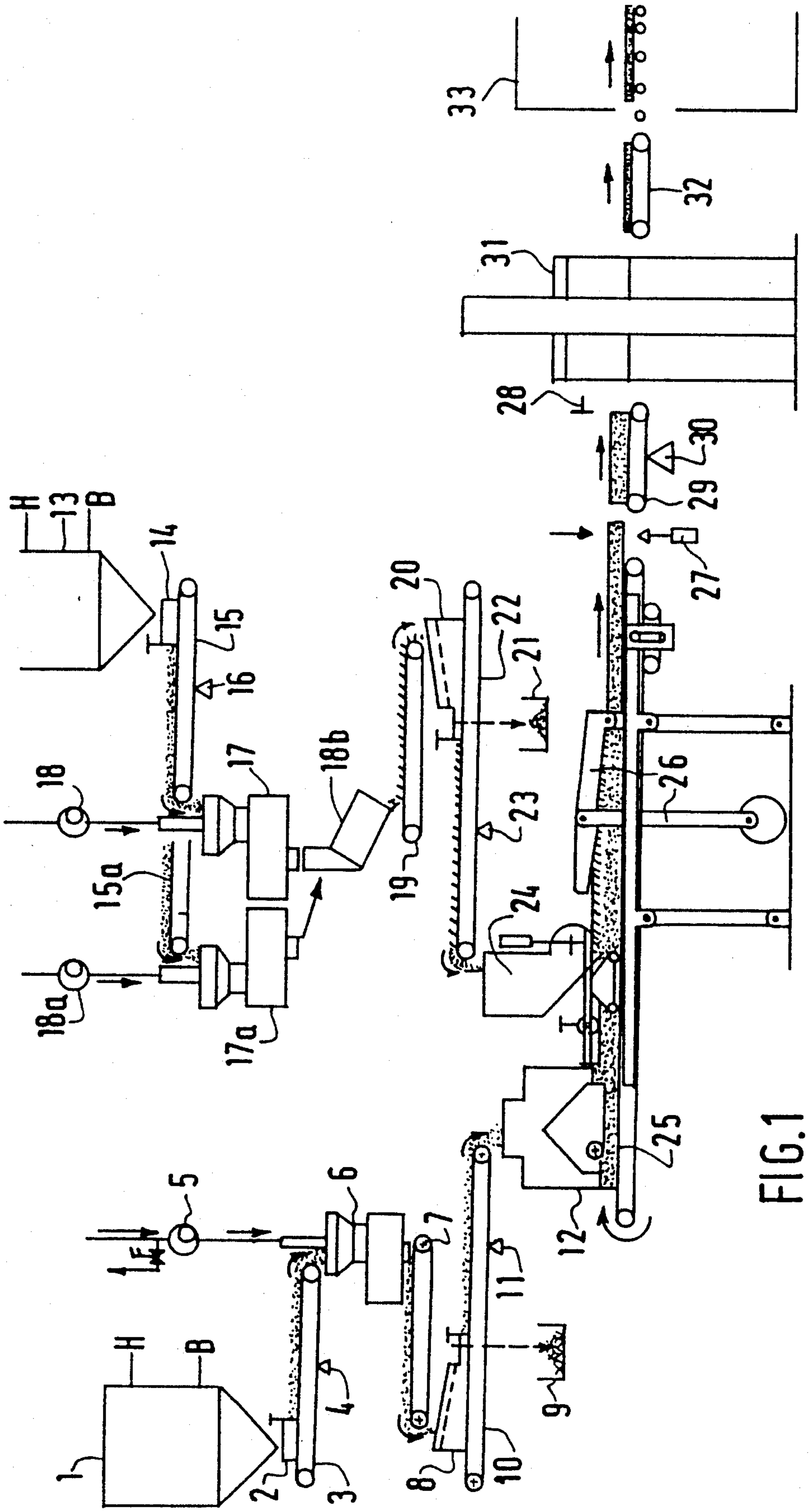
FIG. 1 shows the overall production scheme and installation according to the invention.

The vermiculite that is employed in the process is obtained using exfoliation brought about by thermal shock followed by removal of dust and of all impurities, in order to start out with a constant bulk density and particle size.

The binder is an alkaline silicate such as potassium silicate in liquid form having a determined density and viscosity. It is maintained at the correct temperature for use by continuous recycling and thermostatic control.

The fine particles of the vermiculite are continuously admitted into the silo 1, which is fitted with level sensors, and this silo constitutes a sufficiently large buffer or reserve supply to ensure correct operation of the installation and also allowing temporary storing of reserves which may originate from a difference between the output of the exfoliation kilns and the requirements of the panel production installation.

After leaving the silo 1, the particles are taken up by a continuous transporting and metering assembly which includes a throughput limiting gate valve 2, a conveyer-belt 3 which runs continuously and a weighing system 4.

The vermiculite and the potassium silicate meet in the mixer 6. Coating of the vermiculite particles is obtained by imparting a swirling movement on the particles and dispersing them while in intimate contact with the binder which is in spray form, for example using the mixing device described in the applicant's concurrently-filed co-pending application. The correct throughput and pressure are ensured by the metering pump 5. After leaving the mixer 6, the coated vermiculite is continuously removed by the conveyer belt 7 in order to be sieved on a vibrating screen 8 which retains accidental lump formations and carries them off to a recovery tank 9.

The coated vermiculite is continuously received by a conveyer belt 10 made of an anti-adhesive material with means 11 for checking its weight. Weighing is carried out in order to establish material amounts and to control the throughput of vermiculite at the valve 2 and the amount of silicate provided by the metering pump 5.

From conveyer belt 10, the coated vermiculite is discharged into the dual hopper 12 of a multi-layer distributing and spreading unit 12 in order to form the bottom layer or base layer of the panel.

Regarding now the preparation of the layer of colored vermiculite which is applied by means of the device 24, preparation of this starts in the silo 13. It should be mentioned as this point that the installation for preparing the colored layer as shown in FIG. 1 is made up by two preparation lines enabling two different coloring masses to be obtained which can then be mixed in order to obtain a two-tone or multi-colored layer.

Figure 2:
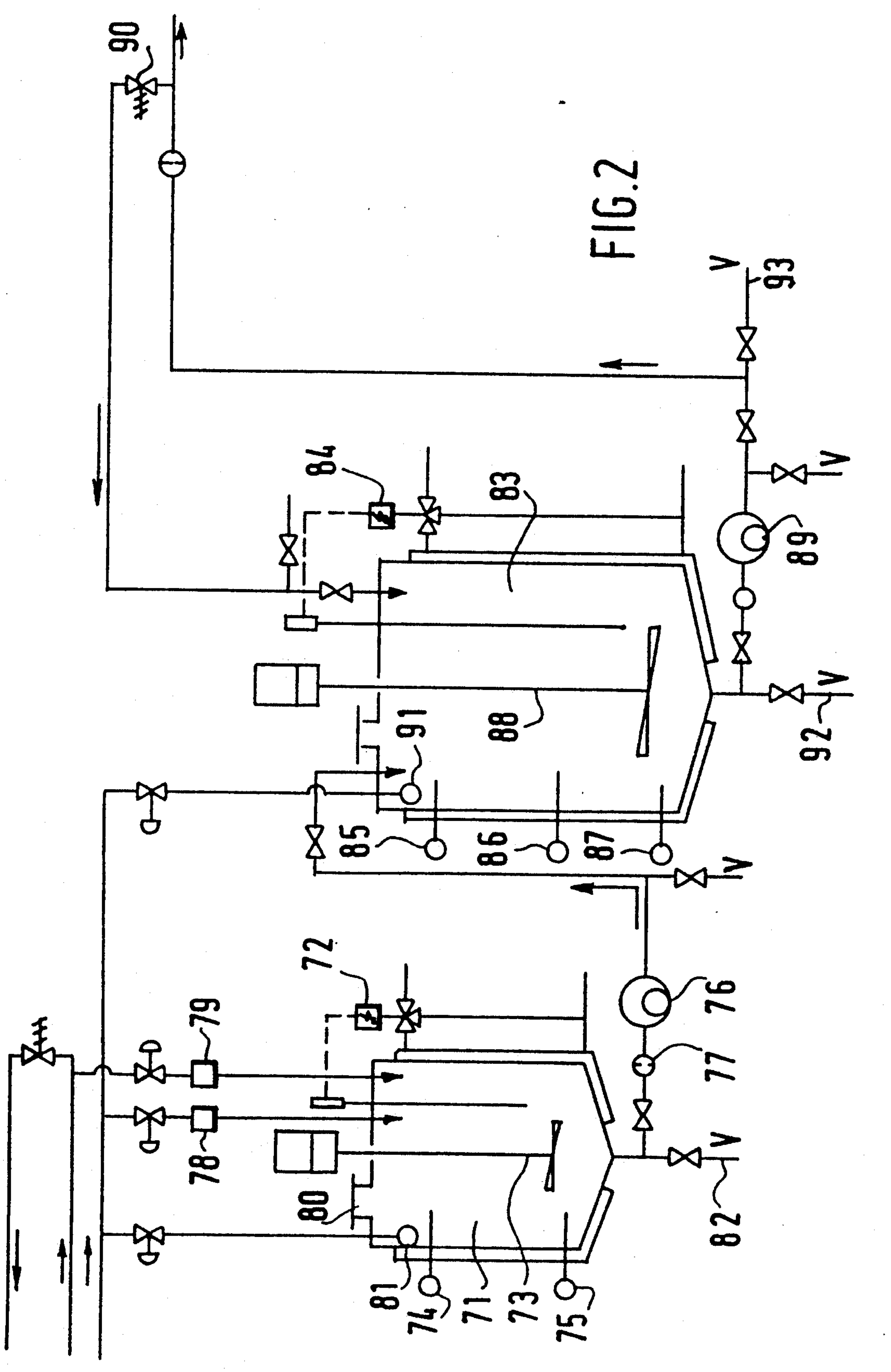
FIG. 2 is a diagrammatical illustration of the method of preparing the colored binders.

The vermiculite is received from the outlet of silo 13 on a conveyer-belt 15, 15*a* of each respective preparation line, and is metered by throughput limiting valves one of which is illustrated at 14, and the weight is checked by a respective weighing system 16. The vermiculite and the previously colored potassium silicate meet in the blender 17, 17*a*, the preparation of the colored binder being described below with reference to FIG. 2.

The colored binder is advantageously prepared in a reaction vessel 71 fitted with a heating jacket ensuring the binder is supplied at a constant temperature through regulating means 72, and is fitted with agitating means 73 and level sensors 74 and 75. A transfer pump 76 fitted with a pre-filtering means 77 transfers the prepared mixtures to a temporary storage tank 83.

The different components, including the liquid state potassium silicate and the coloring agents are introduced into the reaction vessel 71 by the metering valves 78 and 79 if they are in liquid form and through the manhole 80 if they are in powder form.

The reaction vessel is fitted with a cleaning and rinsing system 81 and with an arrangement for drainage thereof 82.

If the buffer tank 83 is in need of replenishing, transfer of the preparation from reaction vessel 71 thereto is carried out automatically by means of the pump 76. The buffer tank 83, which is fitted with level sensors 85, 86 and 87 and with agitating means 88 is maintained by temperature control means 84 at the temperature of use of the binder and a recycling circuit maintained by pumping means 89 ensures good homogeneity of the product.

By taking the product off from said recycling circuit, the metering pump 18 or 18*a* provides a controlled throughput and the necessary pressure for spraying the colored silicate.

The colored binder impregnates the mass of vermiculite preferably during the imparting a swirling movement thereto, using for example the mixing device described in the applicant's abovesaid co-pending application, and the colored vermiculites originating from the blenders 17 and 17*a* are combined together in the mixer 18*b* which takes the form of a rotating drum mounted on an inclined axis and fitted with a helical baffle on its inside wall, and are then received by the conveyer-belt 19 constituted of an anti-adhering material and are sieved on the vibrating screen 20 which retains accidentally formed lumps and directs them to a recovery vessel 21.

Figure 3:
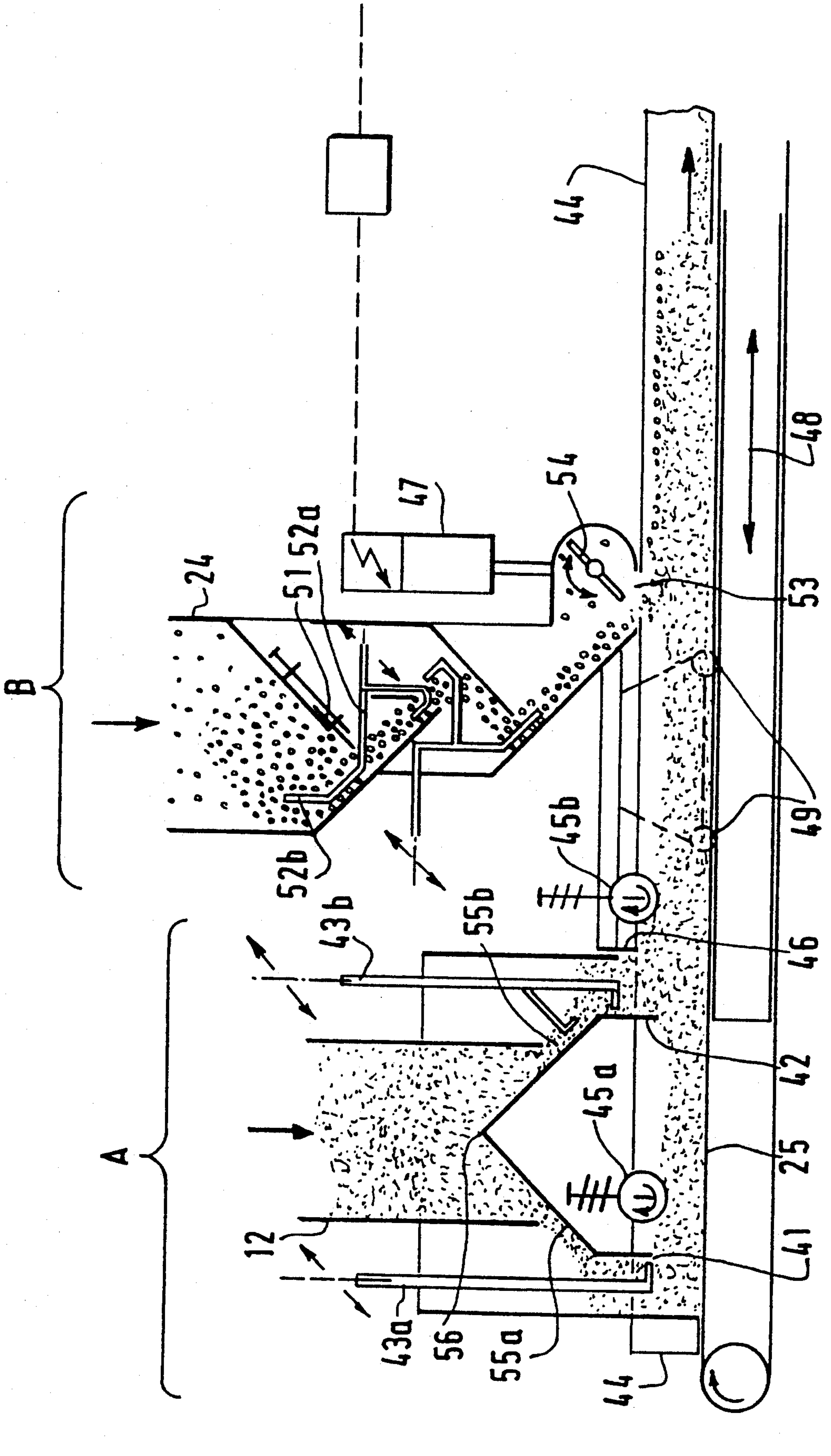
FIG. 3 shows the device for continuously distributing, spreading out and leveling off the deposited layers.

The size-graded colored vermiculites are received by a conveyer-belt 22 fitted with a weight checking system 23 and are then poured into the hopper 24 of the multilayer distributing and spreading device, which is shown in detail in FIG. 3. This second layer hence becomes placed on top of the first layer, which is being simultaneously prepared at an earlier point on the line.

The multi-layer distributing and spreading device is shown in FIG. 3 and is composed of two sub-assemblies A and B. Sub-assembly A distributes the coated particles onto conveyer-belt 25 in one or two separated layers. The discharge from hopper 12 is divided into two by two diverging surfaces 55*a* and 55*b* provided in the base of the hopper, the common edge 56 of said surfaces being situated transversally with respect to the direction of advance of the conveyer-belt. The two resulting flows are directed to discharge outlets 41 and 42.

Equal distribution over the width that it is required to constitute is provided by distributing fingers 43*a* and 43*b* which are driven with a continuous oscillating movement over the belt 25 which is provided with two adjustable lateral guides 44 for width limitation.

The first bed of particles which is formed by the particles discharged by outlet 41 passes under a flattening off roller 45*a* which exercises a slight and variable pressure on the bed.

The second bed of particles formed by the outlet 42 is placed on top of the first bed and its thickness is regulated by means of the shutter or gate valve 46 which is controlled by the integral system 47 controlling the thickness of the upper layers. This second bed of particles passes under a flattening off roller 45 which exercises an adjustable slight pressure thereon.

It should be noted that at this point it is possible to manufacture panels composed of these two layers: such panels then have a natural color.

A second sub-assembly B is responsible for distributing the colored particles that constitute the colored surface layer. This sub-assembly is carried on an oscillating table 48 of the shaping press (see FIG. 3) by means of a sliding support 49.

The hopper 24 supplies particles that have passed over walls provided with baffles constituting a tortuous path, the throughput being regulated by means of a shutter 51. In order to provide dividing up of the individual particles and to break up lumps, the tortuous path to the discharge outlet includes distributing arms 52*a* and 52*b* which are driven with an oscillatory movement The flow of individual particles then arrives in the pouring device 53 where scattering in powderlike form thereof over the moving mat or cake is controlled, by a spinning distributor 54 fitted with Z-shaped vanes. The breaking up of lumps into particles and then the leveling effect produced by the spinning distributor 54 make it possible to regulate the thickness of this layer and, notably, to reduce this thickness to a minimum.

Figure 4:
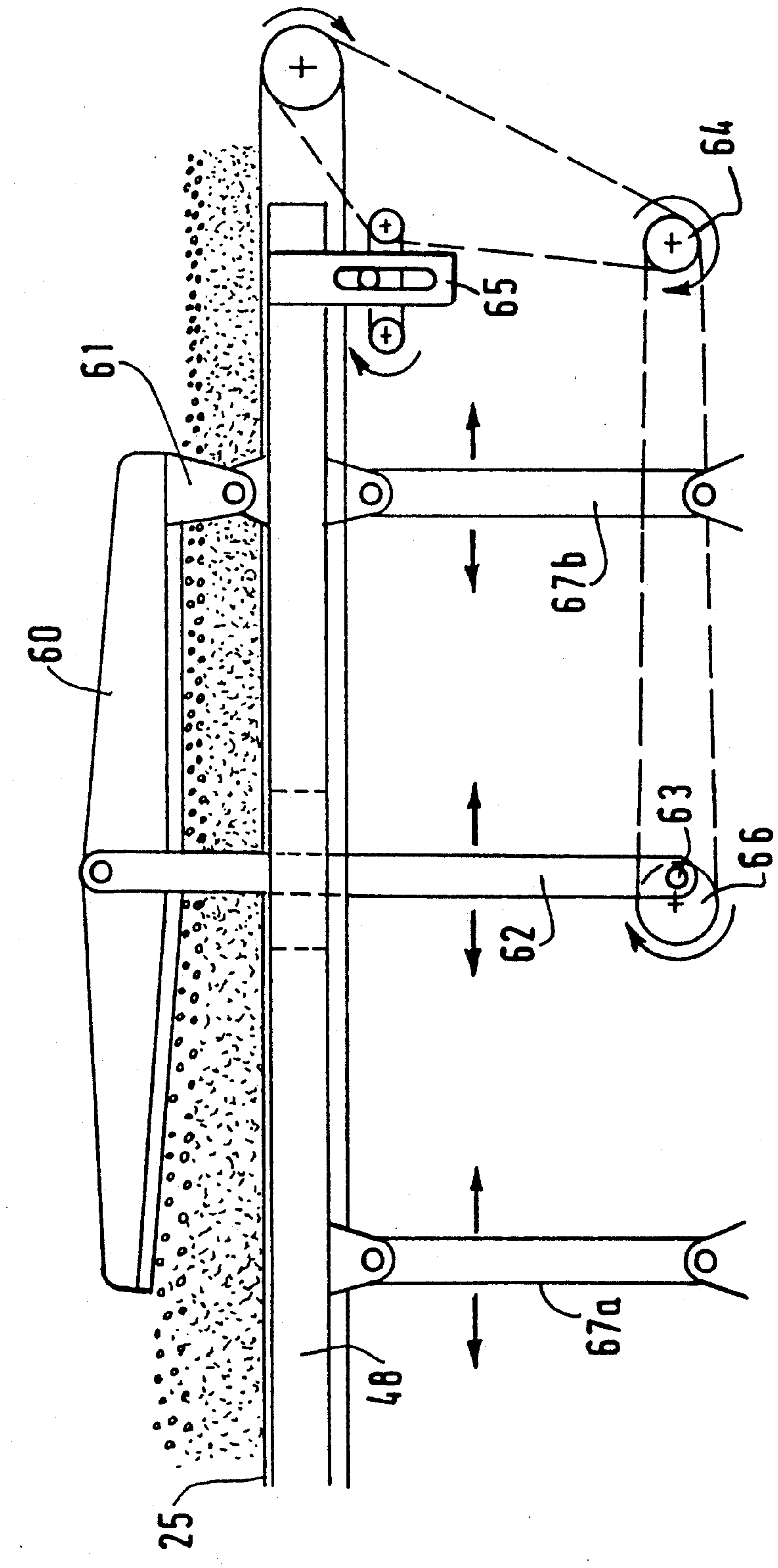
FIG. 4 shows a shaping press for the panels.

Following the multi-layer spreading and distributing device, a shaping machine bearing reference numeral 26 and shown in detail in FIG. 4 is provided which operates by pressing the mat that has been formed and shaped.

The pre-shaped mat transported on conveyer belt 25 is transferred to the shaping machine 26 in order to undergo the required pre-compression needed to form a compact unitary assembly able to be cut without splitting or chipping which could damage its integrity.

The conveyer belt slides over a movable oscillating table 48 which is driven by a deformable parallelogram constituted by connecting rods 67a and 67b and by the motion-converting assembly 65 which is chain-driven by a motor 64 via suitable drive wheels. The same motor also drives a pulley 66 with an eccentrically-mounted member to which, at a point of connection 63, a connecting rod 62 is connected which, in its turn is pivotally connected to an upper compression plate 60 which thus receives an alternating vertical motion which is in synchronization with the oscillations of table 48. Motor 64 also drives the conveyer belt 25. The pre-shaping compression plate 60 which is linked to the movable table 48 by a pivoting joint 61 ensures shaping to a constant thickness, this thickness being adjustable.

The pre-compressed structure composed of the various particles and shaped by the pre-compression machine 26 is then moved by the conveyer belt 25 in order to pass across the cutting unit 27 operation of which is controlled by a variable position detector 28, this position being variable with respect to the point of cutting, enabling panels or slabs of a desired length to be cut off. The panel or slab thus delivered is received by a conveyer belt 29 provided with weighing means 30, the weight found being used to provide a controlling effect on the whole of the process, for example by regulating the throughput in the distributors 12 and 24. The panels or slabs transported by conveyer belt 29 are introduced into the press 31 for the molding operation. After leaving the press, the panels or slabs are thermally treated in stages in the drying tunnel 33 employing a transporting and elevating device 32. Drying, which is carried out under determined time and temperature conditions as a function of the thickness of the panels or slabs and of the production rate, enables the latter to achieve their final strength by evaporation of water from the binder enabling hardening thereof to take place.

After leaving the tunnel, the panels or slabs are dressed and trimmed, brushed and inspected.

We claim:

1. A process for producing colored panels of mineral particulate or granular exfoliated rock-based material agglomerated by a binder, wherein a material resulting from the blending of measured amounts of said particulate matter and an inorganic binder in the liquid or viscous state is continuously deposited onto a movable forming and shaping surface and is then rendered even and slightly compacted in order to form at least one base layer, and at least one further upper layer formed by a mass of particles of the same nature as the first and previously divided into small pieces and which has been thoroughly impregnated with a colored binder is continuously deposited onto said base layer, the combination of said layers moving along said forming and shaping surface and after flattening off at least the upper layer, undergoing pre-compression and then being cut into panels which, after passing through a press, are subjected to thermal treatment in a kiln, wherein said movable forming and shaping surface is constituted by conveyer-belt means which operate in association with at least two distributors for impregnated particles, the first of said distributors feeding non-colored particles and being made up by a hopper with a base having two diverging surfaces originating from a common line located transversely with respect to the direction of advance of said conveyer-belt with the spacings between the walls of said hopper and said diverging surfaces respectively constituting first and second pouring means, the lower edge of one of said surfaces which is located in advance, with respect to said direction of travel, of said common line constituting a limiting means determining the height of a first layer being dispensed from the first pouring means of said hopper while a variable-height sliding gate means located after, in said direction of travel, said first distributor determines the thickness of a second layer being provided by the second pouring means of said hopper, a compression roller being located after each of said first and second pouring means, the second of said distributors feeding colored particles and being located, in the direction of travel, after said first distributor and being provided with means for breaking up said impregnated colored particulate matter into small pieces and for flattening the layer deposited.

2. Process according to claim 1, wherein the particulate matter employed consists of particles of vermiculite, of a particle size comprised between 0.3 and 4 mm, and the binder is an alkaline silicate having a viscosity of the order of 350 mPa.

3. Process according to claim 1, wherein the said thorough impregnation of the particulate matter with a colored binder is achieved by imparting a swirling movement thereto in order to intimately disperse said matter within said colored binder provided in spray form.

4. Process according to claim 1, wherein the particle size of the particulate matter employed for preparing said colored layer is different from the particle size of the other layers.

5. Process according to claim 1, wherein said means providing for the breaking up of said particulate matter into small pieces and for flattening the layer deposited comprise means obliging said impregnated particulate matter to follow a tortuous path within said second distributor and vaned rotating means for spinning said impregnated particulate material at its point of discharge from said distributor and applying it in finely divided form in a thickness determined by the vertical height of said vaned rotating means.

6. Process according to claim 1, wherein the levels of said variable-height sliding gate means of the first distributor and of the point of discharge from said second distributor are controlled by an integrated system for regulating the thicknesses of the upper layers of said panel.

7. Process according to claim 1, wherein a mat composed of the previously formed layers applied by said first and second distributors is subsequently shaped by continuous pressing with the aid of a pre-shaping compression plate the height of which is set by a pivot point at one end thereof and to the other end of which an alternating vertical motion is imparted.

8. Process according to claim 7, wherein one single motor rotatively drives, by means of a continuous drive belt means, a means for imparting an alternating vertical motion to said pre-shaping compression plate and a means for imparting an oscillatory movement to an oscillating table located under said movable forming and shaping surface.

9. A process for producing colored panels of mineral particulate or granular exfoliated rock-based material agglomerated by a binder, wherein a material resulting from the blending of measured amounts of said particulate matter and an inorganic binder in the liquid or viscous state is continuously deposited onto a movable forming and shaping surface and is then rendered even and slightly compacted in order to form at least one base layer, and at least one further upper layer formed by a mass of particles of the same nature as the first and previously divided into small pieces and which has been thoroughly impregnated with a colored binder is continuously deposited onto said base layer, the combination of said layers moving along said forming and shaping surface and after flattening off at least the upper layer, undergoing pre-compression and then being cut into panels which, after passing through a press, are subjected to thermal treatment in a kiln, wherein means are provided for continuously recirculating said colored binder in order to ensure maintenance of a desired constant temperature thereof and good homogeneity of said colored binder.

* * * * *